(12) United States Patent
Halligan et al.

(10) Patent No.: US 11,023,726 B2
(45) Date of Patent: Jun. 1, 2021

(54) AUTOMATIC CAMERA PARAMETER ADJUSTMENT ON A PLANT TREATMENT SYSTEM

(71) Applicant: Blue River Technology Inc., Sunnyvale, CA (US)

(72) Inventors: Deaglan Halligan, Sunnyvale, CA (US); Edward William Jeffcott Pell, Sunnyvale, CA (US); Rajesh Radhakrishnan, Mountain View, CA (US); Thomas Welch Brown, Santa Clara, CA (US); Lee Kamp Redden, Palo Alto, CA (US); James Patrick Ostrowski, Mountain View, CA (US)

(73) Assignee: Blue River Technology Inc., Sunnyvale, CA (US)

( * ) Notice: Subject to any disclaimer, the term of this patent is extended or adjusted under 35 U.S.C. 154(b) by 0 days.

(21) Appl. No.: 17/017,223

(22) Filed: Sep. 10, 2020

(65) Prior Publication Data

US 2020/0410234 A1 Dec. 31, 2020

Related U.S. Application Data

(63) Continuation of application No. 15/975,066, filed on May 9, 2018, now Pat. No. 10,803,311.
(Continued)

(51) Int. Cl.
*G06K 9/00* (2006.01)
*G06T 7/00* (2017.01)
(Continued)

(52) U.S. Cl.
CPC ....... *G06K 9/00657* (2013.01); *G06K 9/3233* (2013.01); *G06K 9/4652* (2013.01);
(Continued)

(58) Field of Classification Search
CPC ... G06K 9/00657; G01B 11/24; H04N 5/2353
See application file for complete search history.

(56) References Cited

U.S. PATENT DOCUMENTS

| 5,253,302 A | 10/1993 | Massen |
| 6,191,842 B1 | 2/2001 | Navarro |

(Continued)

FOREIGN PATENT DOCUMENTS

| CN | 104361342 A | 2/2015 |
| EP | 3316673 A1 | 5/2018 |

(Continued)

OTHER PUBLICATIONS

Liu, W, et al., "SSD: Single Shot MultiBox Detector," European Conference on Computer Vision ECCV 2016: Computer Vision—ECCV 2016, pp. 21-37, Can be retrieved at <URL: http://www.cs.unc.edu/~wliu/papers/ssd.pdf>.
(Continued)

*Primary Examiner* — Myron Wyche
(74) *Attorney, Agent, or Firm* — Fenwick & West LLP

(57) ABSTRACT

A plant treatment system automatically adjusts camera operation parameters for a camera used by the plant treatment system to identify and treat plants in a field. The plant treatment system can generate image segments of images received from the camera and classify the image segments based on whether the image segments represent plants. The plant treatment system determines whether each of the image segments is over- or under-exposed and adjusts the camera operation parameters for the camera based on the exposure classification of the image segments. Alternatively, the plant treatment system may use a plant detection model to identify plant pixels within an image that represent plants. The plant treatment system can then determine whether the
(Continued)

identified plant pixels are over- or under-exposed and adjust the camera operation parameters accordingly.

20 Claims, 8 Drawing Sheets

Related U.S. Application Data

(60) Provisional application No. 62/503,770, filed on May 9, 2017, provisional application No. 62/537,198, filed on Jul. 26, 2017, provisional application No. 62/580,290, filed on Nov. 1, 2017.

(51) Int. Cl.
| | |
|---|---|
| *G06T 7/11* | (2017.01) |
| *G06K 9/62* | (2006.01) |
| *G06T 7/70* | (2017.01) |
| *G06K 9/32* | (2006.01) |
| *H04N 5/235* | (2006.01) |
| *H04N 5/232* | (2006.01) |
| *G06T 5/50* | (2006.01) |
| *G06T 5/00* | (2006.01) |
| *G06K 9/46* | (2006.01) |
| *G06T 7/143* | (2017.01) |
| *G06T 7/174* | (2017.01) |

(52) U.S. Cl.
CPC ......... *G06K 9/6267* (2013.01); *G06K 9/6277* (2013.01); *G06T 5/009* (2013.01); *G06T 5/50* (2013.01); *G06T 7/11* (2017.01); *G06T 7/143* (2017.01); *G06T 7/174* (2017.01); *G06T 7/70* (2017.01); *G06T 7/97* (2017.01); *H04N 5/2351* (2013.01); *H04N 5/2352* (2013.01); *H04N 5/23229* (2013.01); *G06T 2207/10012* (2013.01); *G06T 2207/10016* (2013.01); *G06T 2207/10024* (2013.01); *G06T 2207/10028* (2013.01); *G06T 2207/10048* (2013.01); *G06T 2207/10144* (2013.01); *G06T 2207/20081* (2013.01); *G06T 2207/20208* (2013.01); *G06T 2207/30188* (2013.01)

(56) References Cited

U.S. PATENT DOCUMENTS

| | | |
|---|---|---|
| 6,930,710 B1 | 8/2005 | Classen et al. |
| 7,424,133 B2 | 9/2008 | Schultz et al. |
| 8,693,778 B1 | 4/2014 | Landwehr et al. |
| 2005/0271292 A1 | 12/2005 | Hekkers |
| 2009/0153659 A1 | 6/2009 | Landwehr et al. |
| 2013/0235183 A1 | 9/2013 | Redden |
| 2014/0168412 A1 | 6/2014 | Shulman et al. |
| 2015/0015697 A1* | 1/2015 | Redden ............... G06K 9/6202 348/89 |
| 2015/0027040 A1 | 1/2015 | Redden |
| 2016/0307329 A1 | 10/2016 | Isler et al. |
| 2017/0206415 A1 | 7/2017 | Redden |
| 2017/0223947 A1 | 8/2017 | Gall et al. |
| 2018/0022208 A1 | 1/2018 | Calleija et al. |

FOREIGN PATENT DOCUMENTS

| | | |
|---|---|---|
| WO | WO 2015/006675 A2 | 1/2015 |
| WO | WO 2016/090414 A1 | 6/2016 |
| WO | WO2016/123656 A1 | 8/2016 |
| WO | WO2016/191825 A1 | 12/2016 |
| WO | WO2017/214686 A1 | 12/2017 |

OTHER PUBLICATIONS

PCT International Search Report and Written Opinion, PCT Application No. PCT/US2018/031841, dated Jul. 31, 2018, 24 pages.
PCT International Search Report and Written Opinion, PCT Application No. PCT/US2018/031845, dated Jul. 30, 2018, 18 pages.
United States Office Action, U.S. Appl. No. 15/975,092, dated Nov. 15, 2019, 11 pages.
United States Office Action, U.S. Appl. No. 15/975,066, dated Mar. 18, 2020, 18 pages.
U.S. Office Action, U.S. Appl. No. 15/975,092, dated Nov. 12, 2020, 23 pages.

* cited by examiner

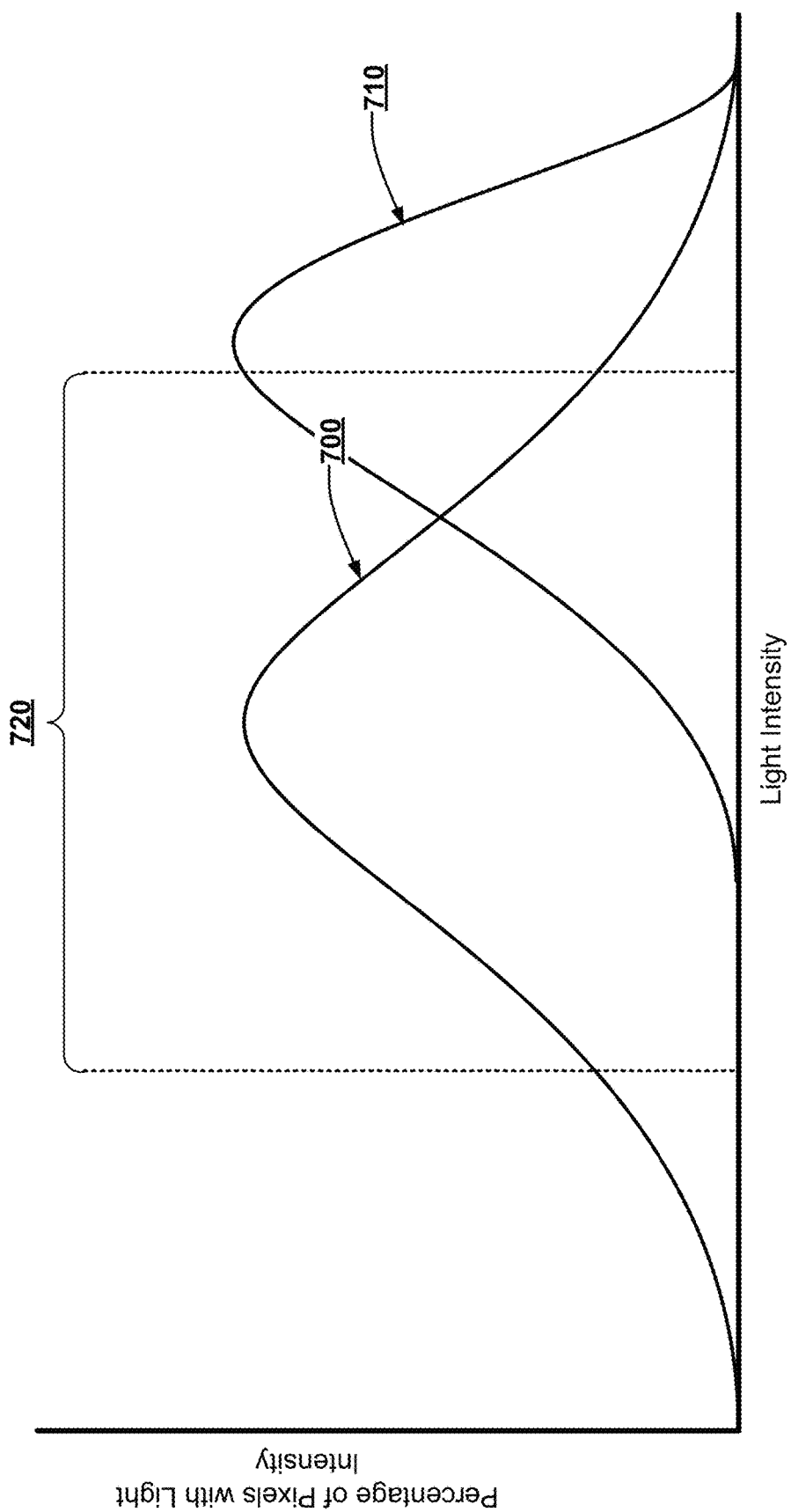

AUTOMATIC CAMERA PARAMETER ADJUSTMENT ON A PLANT TREATMENT SYSTEM

CROSS REFERENCE TO RELATED APPLICATION

This application is a continuation of U.S. patent application Ser. No. 15/975,066 filed May 9, 2018, which claims the benefit of U.S. Provisional Patent Application Nos. 62/503,770 filed May 9, 2017, 62/537,198 filed Jul. 26, 2017, and 62/580,290 filed Nov. 1, 2017, the contents of each of which are hereby incorporated by reference in their entirety.

BACKGROUND

Plant treatment systems apply treatments to plants in a field as the plant treatment systems traverse through the field. For example, a plant treatment system may apply fertilizer or pesticide to crops in the field or herbicide to weeds in the field. Many conventional plant treatment systems apply broad treatments to all plants in the field. For example, some plant treatment systems simply apply a spray treatment continuously such that the spray treatment is applied to all plants and a significant portion of the ground. These systems are inefficient in the amount of treatment that they apply to plants in the field and require treatments that can be applied to crops and weed alike.

Some plant treatment systems use cameras to apply targeted treatment to plants in the field. However, parameters for operating the camera may become uncalibrated during the operation of the plant treatment system. For example, the lighting conditions in the field may change as the sun rises or sets and changing weather conditions may impact the quality of the images captured by the camera. As a result, conventional plant treatment systems fail to ensure consistent quality of the images captured by the camera.

SUMMARY

A plant treatment system automatically adjusts the camera operation parameters of a camera to dynamically improve the quality of images captured by the plant treatment system. Any one of several different processes may be used to adjust the camera operation parameters.

In one implementation, the plant treatment system uses image segments to adjust the camera operation parameters. The plant treatment system receives an image from a camera used by the plant treatment system to identify and treat plants in a field. The plant treatment system segments the image into one or more segments of the image that contain pixels with similar pixel color values. In one embodiment, the plant treatment system generates superpixels for the image. The plant treatment system determines whether each of the segments of the image represents a portion of a plant that is captured by the image. The plant treatment system may further determine a plant type for one or more image segments, such as whether the plant is a crop or a weed or the species of the plant. Additionally or alternatively, the plant treatment system may classify each image segments as being over-exposed, under-exposed, or acceptably exposed. The plant treatment system adjusts the camera operation parameters for the camera based on the classifications of the plant image segments.

In another implementation, the plant treatment system identifies individual pixels within an image as representing plants and uses the exposure of those pixels to adjust the camera operation parameters for the camera. The plant treatment system applies a plant detection model to the received image to identify pixels that represent plants. The plant detection model may be generated by mapping the pixel values for plant pixels labeled in training images in the HS color space and by identifying a plant identification region within HS color space that contains pixel values for pixels that represent plants. The plant treatment system determines the exposure of the identified pixels in the image and adjusts the camera operation parameters based on the exposure of the identified pixels.

The plant treatment system described herein improves on conventional plant treatment systems by allowing the plant treatment system to automatically improve camera operation parameters while the plant treatment system is in operation. The plant treatment system can thereby be more broadly applied to different types of plants, different types of fields, and in different environments. Furthermore, by adjusting the camera operation parameters based on image segments or plant pixels rather than images as a whole, the plant treatment system can capture images with camera operation parameters that can be more effectively used to identify and treat plants in the field.

BRIEF DESCRIPTION OF THE DRAWINGS

FIG. 7A illustrates a region of an example light intensity histogram captured with conventional camera operation parameters, in accordance with some embodiments.

DETAILED DESCRIPTION

Example Plant Treatment System

Figure 1A:
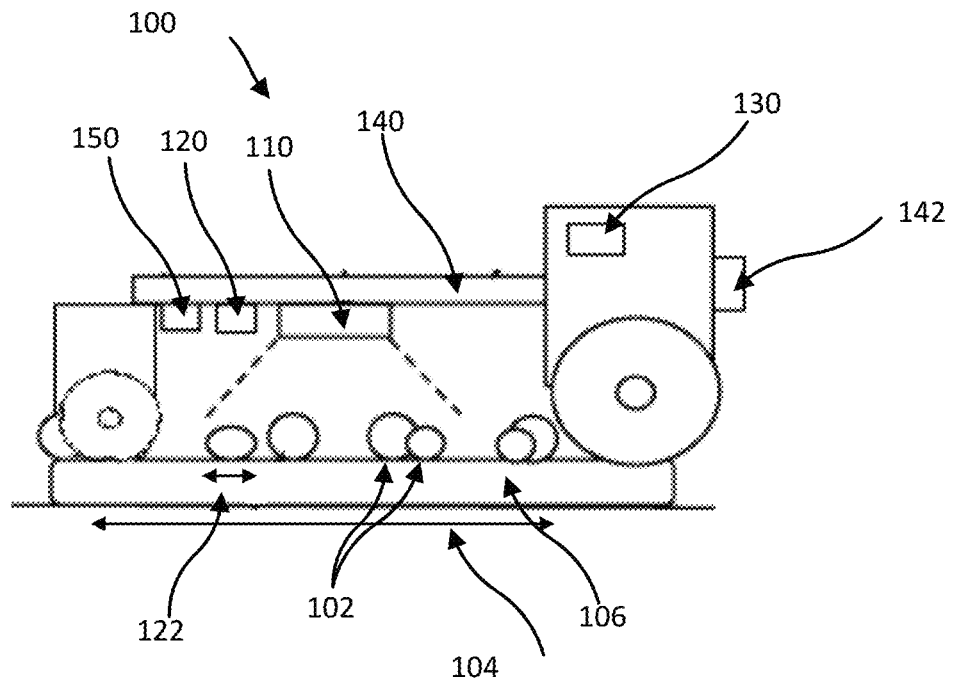
FIGS. 1A and 1B illustrates an example system architecture of a plant treatment system, in accordance with some embodiments.
Figure 1B:
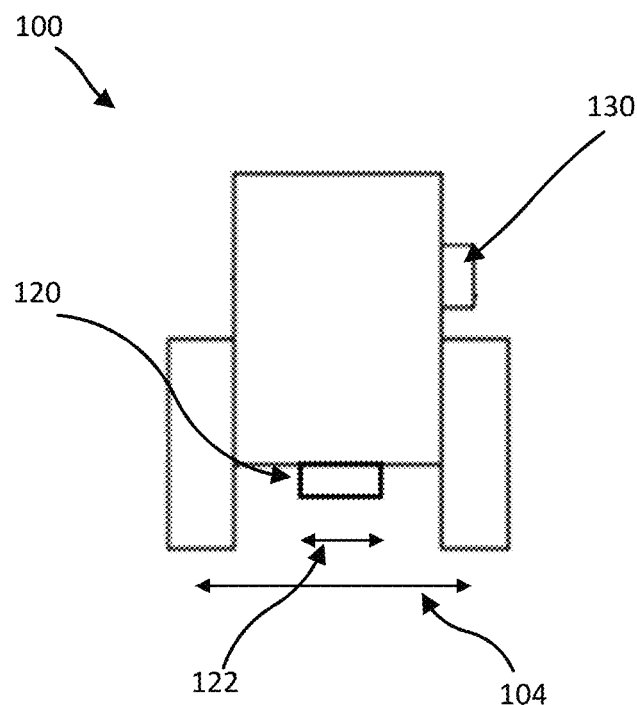

FIGS. 1A and 1B are illustrations of a plant treatment system for manipulating plants in a field, according to one example embodiment. While the illustrated plant treatment system 100 is akin to a tractor pulling a farming implement, the system can be any sort of system for manipulating plants 102 in a field. For example, the plant treatment system 100 can be a combine harvester, a crop thinner, a seeder, a planter, a boom sprayer, etc. Additionally, in some embodiments, the plant treatment system 100 may be an aerial drone that performs data collection functions and may or may not apply a treatment to crops in a field. The plant treatment system 100 for plant manipulation can include any number of cameras 110, manipulation components 120 (components), and control systems 130. The plant treatment system 100 can additionally include any number of mounting mechanisms 140, verification systems 150, power sources, digital memory, communication apparatus, or any other suitable components.

The plant treatment system 100 functions to manipulate one or multiple plants 102 within a geographic area 104. In various configurations, the plant treatment system 100 manipulates the plants 102 to regulate growth, harvest some portion of the plant, treat a plant with a fluid, monitor the plant, terminate plant growth, remove a plant from the environment, or any other type of plant manipulation. Often, the plant treatment system 100 directly manipulates a single plant 102 with a component 120, but can also manipulate multiple plants 102, indirectly manipulate one or more plants 102 in proximity to the plant treatment system 100, etc. Additionally, the plant treatment system 100 can manipulate a portion of a single plant 102 rather than a whole plant 102. For example, in various embodiments, the plant treatment system 100 can prune a single leaf off of a large plant, or can remove an entire plant from the soil. In other configurations, the plant treatment system 100 can manipulate the environment of plants 102 with various components 120. For example, the plant treatment system 100 can remove soil to plant new plants within the geographic area 104, remove unwanted objects from the soil in the geographic area 104, etc.

The plants 102 can be crops, but can alternatively be weeds or any other suitable plant. The crop may be cotton, but can alternatively be lettuce, soy beans, rice, carrots, tomatoes, corn, broccoli, cabbage, potatoes, wheat or any other suitable commercial crop. The plant field in which the plant treatment system is used is an outdoor plant field, but can alternatively be plants 102 within a greenhouse, a laboratory, a grow house, a set of containers, a machine, or any other suitable environment. The plants 102 can be grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The plant rows are generally spaced between 2 inches and 45 inches apart (e.g. as determined from the longitudinal row axis), but can alternatively be spaced any suitable distance apart, or have variable spacing between multiple rows. In other configurations, the plants are not grown in rows.

The plants 102 within each plant field, plant row, or plant field subdivision generally includes the same type of crop (e.g. same genus, same species, etc.), but can alternatively include multiple crops or plants (e.g., a first and a second plant), both of which can be independently manipulated. Each plant 102 can include a stem, arranged superior (e.g., above) the substrate, which supports the branches, leaves, and fruits of the plant. Each plant 102 can additionally include a root system joined to the stem, located inferior the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems. The plant can have a tap root system or a fibrous root system. The substrate 106 is soil, but can alternatively be a sponge or any other suitable substrate. The components 120 of the plant treatment system 100 can manipulate any type of plant 102, any portion of the plant 102, or any portion of the substrate 106 independently.

Figure 4:
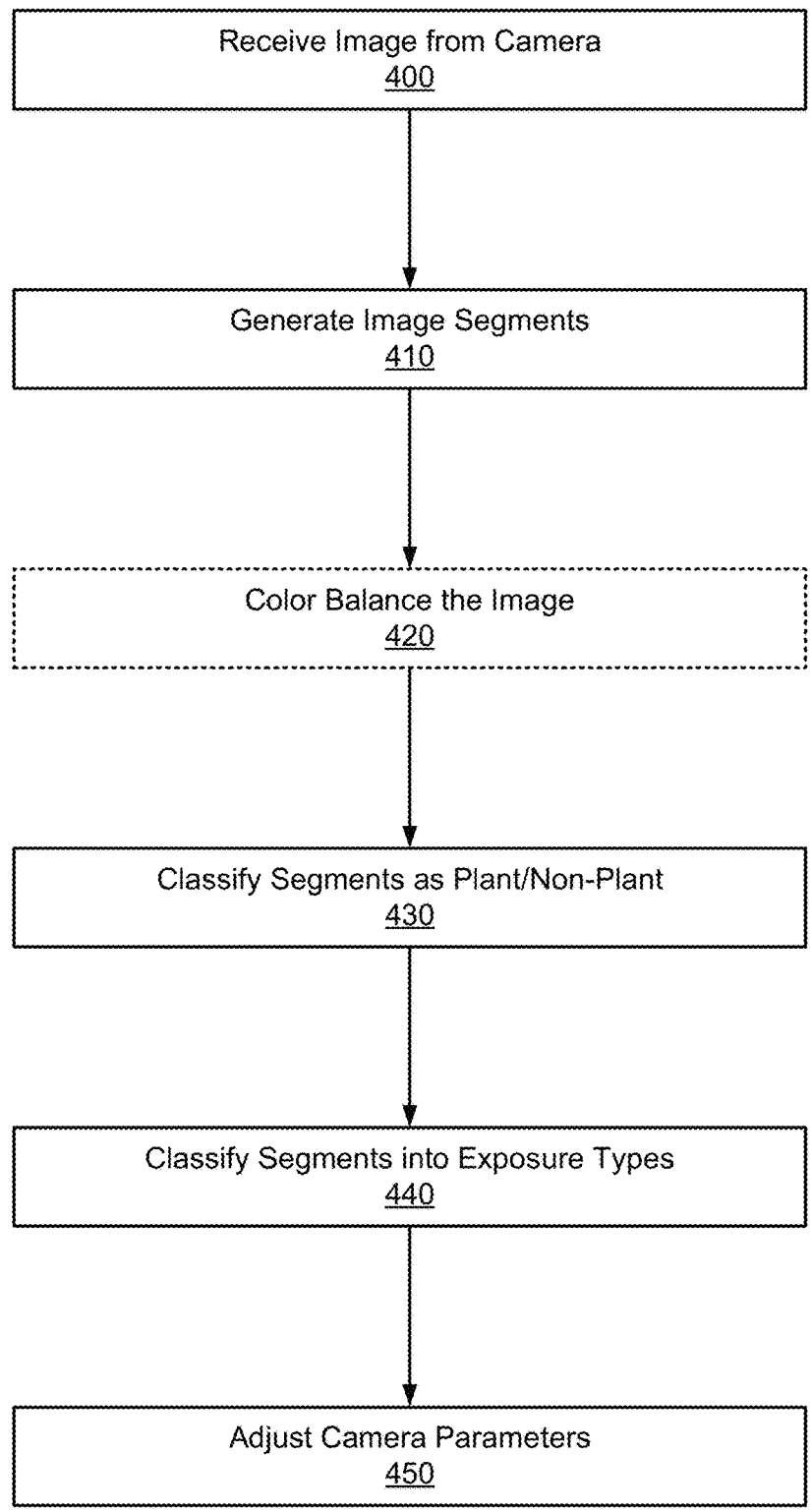
FIG. 4 is a flowchart for an example method of adjusting camera operation parameters for a camera of a plant treatment system, in accordance with some embodiments.
Figure 5:
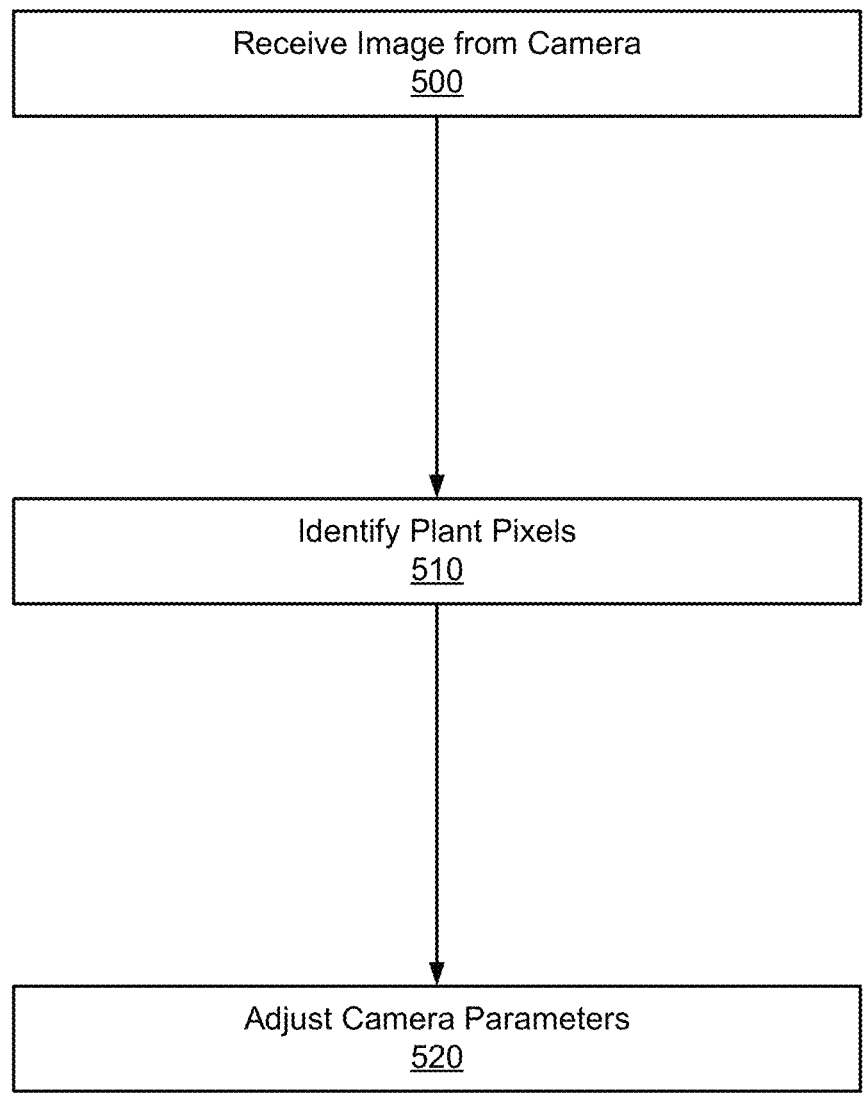
FIG. 5 is a flowchart for an example method of adjusting camera operation parameters for a camera of a plant treatment system, in accordance with some embodiments.

The plant treatment system 100 includes multiple cameras 110 configured to image plants 102 in the field. In some configurations, each camera 110 is configured to image a single row of plants 102 but can image any number of plants in the geographic area 104. The cameras 110 function to identify individual plants 102, or parts of plants 102, as the plant treatment system 100 travels through the geographic area 104. The camera 110 can also identify elements of the environment surrounding the plants 102 of elements in the geographic area 104. The camera 110 can be used to control any of the components 120 such that a component 120 manipulates an identified plant, part of a plant, or element of the environment. In various configurations, the detection system 110 can include any number of sensors that can take a measurement to identify a plant. The sensors can include a multispectral camera, a stereo camera, a CCD camera, a CMOS camera, a single lens camera, hyperspectral imaging system, LIDAR system (light detection and ranging system), dynamometer, IR camera, thermal camera, or any other suitable detection mechanism. The plant treatment system 100 operates the camera in accordance with a set of camera operation parameters, such as the exposure of images captured by the camera 110. The set of camera operation parameters may be adjusted over time to ensure that the plant treatment system 100 can effectively identify plants in images captured by the camera 110. Example camera operation parameters that may be adjusted include, but are not limited to: exposure sensitivity parameters such as the gain and shutter speed of the camera 110, color balance parameters such as white balance settings, and aperture parameters. The camera operation parameters additionally may include gains for multiple spectral channels for multi-spectral cameras. FIGS. 4 and 5 describe methods that may be used by the parameter adjustment module 120 to adjust the camera operation parameters of the camera 110.

Each camera 110 can be coupled to the plant treatment system 100 a distance away from a component 120. The camera 110 can be statically coupled to the plant treatment system 100 but can also be movably coupled (e.g., with a movable bracket) to the plant treatment system 100. Generally, plant treatment system 100 includes some cameras 110 that are positioned so as to capture data regarding a plant before the component 120 encounters the plant such that a plant can be identified before it is manipulated. In some configurations, the component 120 and camera 110 arranged such that the centerlines of the camera 110 (e.g. centerline of the field of view of the camera) and a component 120 are aligned, but can alternatively be arranged such that the centerlines are offset. Other cameras 110 may be arranged to observe the operation of one of the components 120 of the device, such as harvested grain passing into a plant storage component, or a harvested grain passing through a sorting component.

A component 120 of the plant treatment system 100 functions to manipulate plants 102 as the plant treatment system 100 travels through the geographic area. A component 120 of the plant treatment system 100 can, alternatively or additionally, function to affect the performance of the plant treatment system 100 even though it is not configured to manipulate a plant 102. In some examples, the component 120 includes an active area 122 to which the component 120 manipulates. The effect of the manipulation can include plant necrosis, plant growth stimulation, plant portion necrosis or removal, plant portion growth stimulation, or any other suitable manipulation. The manipulation can include plant 102 dislodgement from the substrate 106, severing the plant 102 (e.g., cutting), fertilizing the plant 102, watering the plant 102, injecting one or more working fluids into the substrate adjacent the plant 102 (e.g., within a threshold distance from the plant), harvesting a portion of the plant 102, or otherwise manipulating the plant 102.

Generally, each component 120 is controlled by an actuator. Each actuator is configured to positon and activate each component 120 such that the component 120 manipulates a plant 102 when instructed. In various configurations, the actuator can position a component such that the active area 122 of the component 120 is aligned with a plant to be manipulated. Each actuator is communicatively coupled with an input controller that receives machine commands from the control system 130 instructing the component 120 to manipulate a plant 102. The component 120 is operable between a standby mode, where the component does not manipulate a plant 102 or affect plant treatment system 100 performance, and a manipulation mode, wherein the component 120 is controlled by the actuation controller to manipulate the plant or affects plant treatment system 100 performance. However, the component(s) 120 can be operable in any other suitable number of operation modes. Further, an operation mode can have any number of sub-modes configured to control manipulation of the plant 102 or affect performance of the plant treatment system.

The plant treatment system 100 can include a single component 120, or can include multiple components. The multiple components can be the same type of component, or be different types of components. In some configurations, a component can include any number of manipulation sub-components that, in aggregate, perform the function of a single component 120. For example, a component 120 configured to spray treatment fluid on a plant 102 can include sub-components such as a nozzle, a valve, a manifold, and a treatment fluid reservoir. The sub-components function together to spray treatment fluid on a plant 102 in the geographic area 104. In another example, a component 120 configured to move a plant 102 towards a storage component can include sub-components such as a motor, a conveyor, a container, and an elevator. The sub-components function together to move a plant towards a storage component of the plant treatment system 100.

In one example configuration, the plant treatment system 100 can additionally include a mounting mechanism 140 that functions to provide a mounting point for the various plant treatment system 100 elements. In one example, the mounting mechanism 140 statically retains and mechanically supports the positions of the camera(s) 110, component(s) 120, and verification system(s) 150 relative to a longitudinal axis of the mounting mechanism 140. The mounting mechanism 140 is a chassis or frame, but can alternatively be any other suitable mounting mechanism. In some configurations, there may be no mounting mechanism 140, or the mounting mechanism can be incorporated into any other component of the plant treatment system 100.

In one example plant treatment system 100, the system may also include a first set of coaxial wheels, each wheel of the set arranged along an opposing side of the mounting mechanism 140, and can additionally include a second set of coaxial wheels, wherein the rotational axis of the second set of wheels is parallel the rotational axis of the first set of wheels. However, the system can include any suitable number of wheels in any suitable configuration. The plant treatment system 100 may also include a coupling mechanism 142, such as a hitch, that functions to removably or statically couple to a drive mechanism, such as a tractor, more to the rear of the drive mechanism (such that the plant treatment system 100 is dragged behind the drive mechanism), but alternatively the front of the drive mechanism or to the side of the drive mechanism. Alternatively, the plant treatment system 100 can include the drive mechanism (e.g., a motor and drive train coupled to the first and/or second set of wheels). In other example systems, the system may have any other means of traversing through the field.

In some example systems, the camera 110 can be mounted to the mounting mechanism 140, such that the camera 110 traverses over a geographic location before the component 120 traverses over the geographic location. In one variation of the plant treatment system 100, the camera 110 is statically mounted to the mounting mechanism 140 proximal the component 120. In variants including a verification system 150, the verification system 150 is arranged distal to the camera 110, with the component 120 arranged there between, such that the verification system 150 traverses over the geographic location after component 120 traversal. However, the mounting mechanism 140 can retain the relative positions of the system components in any other suitable configuration. In other systems, the camera 110 can be incorporated into any other component of the plant treatment system 100.

The plant treatment system 100 can include a verification system 150 that functions to record a measurement of the system, the substrate, the geographic region, and/or the plants in the geographic area. The measurements are used to verify or determine the state of the system, the state of the environment, the state substrate, the geographic region, or the extent of plant manipulation by the plant treatment system 100. The verification system 150 can, in some configurations, record the measurements made by the verification system and/or access measurements previously made by the verification system 150. The verification system 150 can be used to empirically determine results of component 120 operation as the plant treatment system 100 manipulates plants 102. In other configurations, the verification system 150 can access measurements from the sensors and derive additional measurements from the data. In some configurations of the plant treatment system 100, the verification system 150 can be included in any other components of the system. The verification system 150 can be substantially similar to the camera 110, or be different from the camera 110.

In various configurations, the sensors of a verification system 150 can include a multispectral camera, a stereo camera, a CCD camera, a single lens camera, hyperspectral imaging system, LIDAR system (light detection and ranging system), dyanmometer, IR camera, thermal camera, humidity sensor, light sensor, temperature sensor, speed sensor, rpm sensor, pressure sensor, or any other suitable sensor.

In some configurations, the plant treatment system 100 can additionally include a power source, which functions to power the system components, including the camera 100, control system 130, and component 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the plant treatment system 100.

In some configurations, the plant treatment system 100 can additionally include a communication apparatus, which functions to communicate (e.g., send and/or receive) data between the control system 130, the identification system 110, the verification system 150, and the components 120. The communication apparatus can be a Wi-Fi communication system, a cellular communication system, a short-range communication system (e.g., Bluetooth, NFC, etc.), a wired communication system or any other suitable communication system.

Generating Improved Images

In some embodiments, the plant treatment system may capture more than one image for each crop plant. The set of images for one crop plant may be captured with different camera operation parameters for each image. For example, each image of the set of images captured for a crop plant may be captured with a different exposure sensitivity parameter for the camera. The set of images for a crop plant may be used to generate improved images for each crop plant. For example, the set of images captured with different exposure sensitivity parameters may be stitched together to generate an improved image for the crop plant that has a greater range of pixel values than images captured directly by the camera 110.

Figure 2:
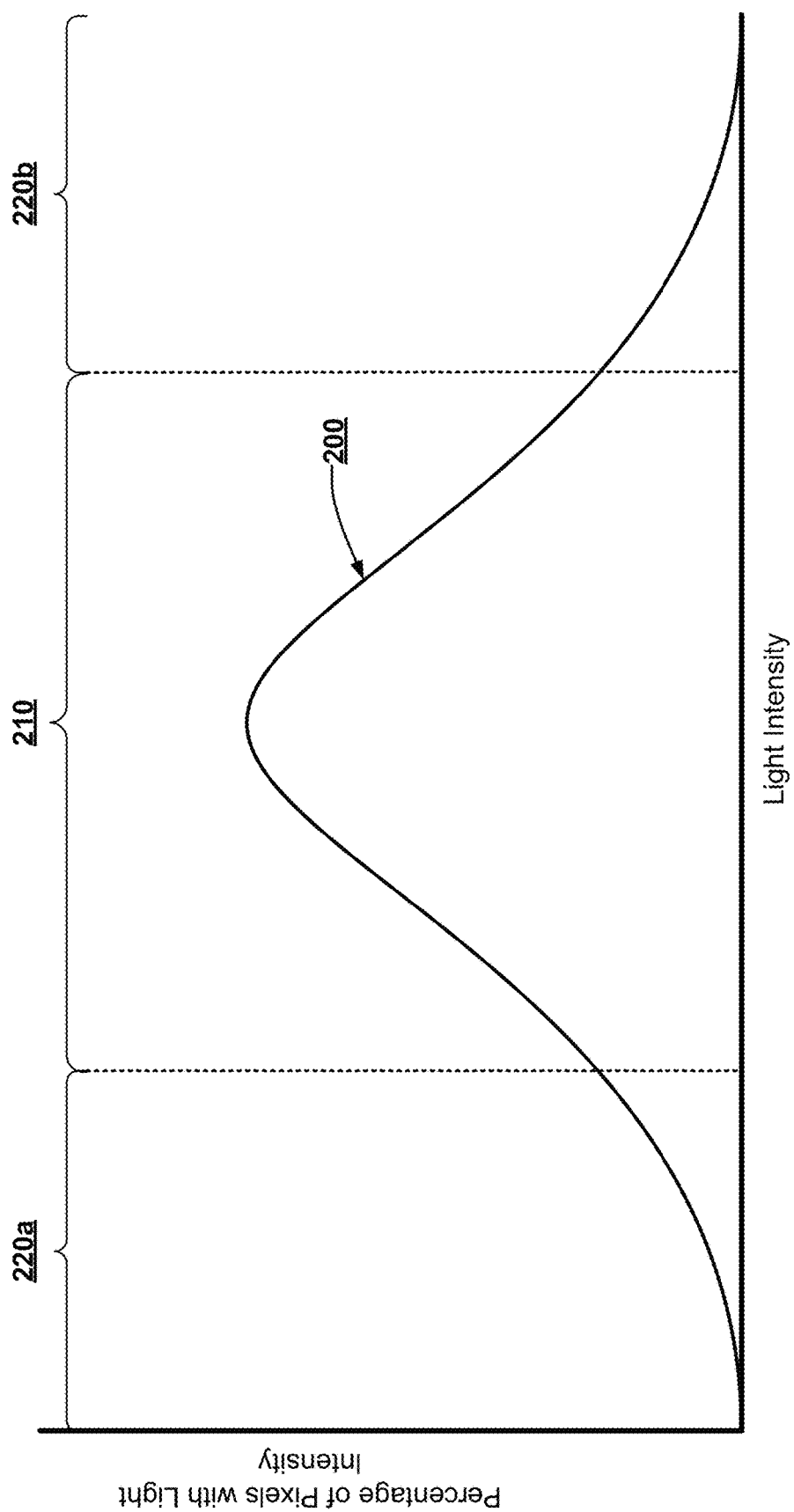
FIG. 2 illustrates an example light intensity histogram illustrating an example distribution of light intensities received at pixels of an imaging sensor of the camera when capturing an image, in accordance with some embodiments.

FIG. 2 illustrates an example light intensity histogram 200 illustrating an example distribution of light intensities received at pixels of an imaging sensor of the camera 110 when capturing an image, in accordance with some embodiments. The imaging sensor of the camera 110 converts light intensities to pixel values when capturing an image, where the pixel values describe the light intensity received at a pixel of the imaging sensor. However, the imaging sensor can only generate a set range of discrete pixel values. For example, the imaging sensor may only be able to generate pixel values within the range of 0 to 255, though other pixel ranges may be used. Thus, only a portion 210 of the light intensity histogram 200 can be effectively captured within the range of pixel values. Portions 220 of the light intensity histogram 200 that are outside of the portion 210 of the light intensity histogram 200 that can be effectively captured may be assigned the lowest or highest pixel value in the set range of pixel values. For example, portion 220a of the light intensity histogram 200, representing low-intensity light received at a pixel, may be assigned a pixel value of 0 and portion 220b, representing high-intensity light received at a pixel, may be assigned a pixel value of 255. Thus, due to the fixed range of pixel values, details of the portions 220 outside of the set pixel range 210 are lost by constraining the possible assignments of pixel values to the upper and lower bounds of the range. Therefore, information, specifically knowledge that some pixels experienced light intensities higher or lower than the set range permits, is lost. Over many pixels, this may be represented in captured images as undifferentiated/uniform, entirely white or entirely black regions. These regions generally do not provide meaningful information upon which image processing can be performed for any of the tasks described herein.

Figure 3:
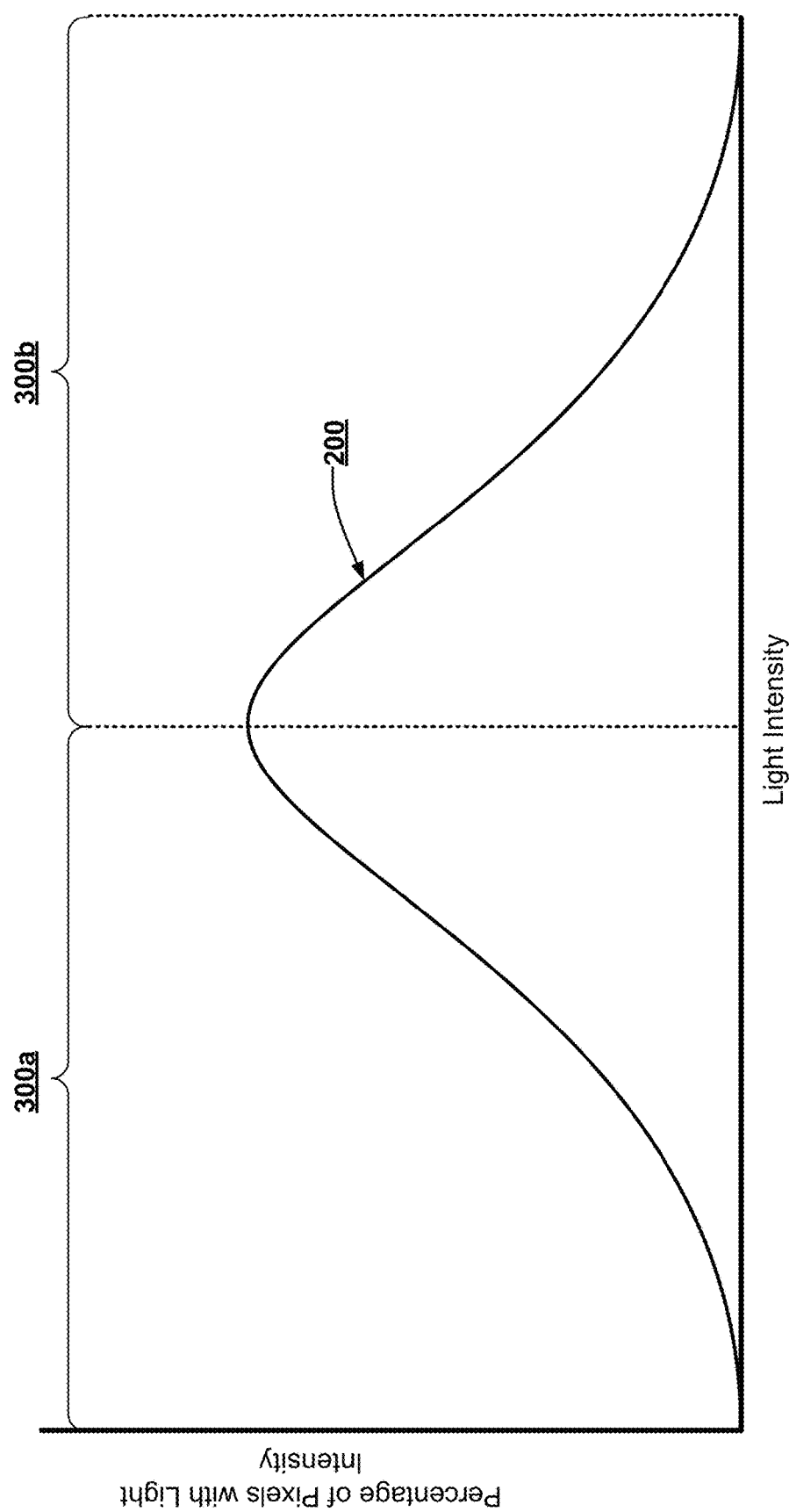
FIG. 3 illustrates the example light intensity histogram wherein two images are captured with different exposure sensitivity parameters such that a broader portion of the light intensity histogram is captured within a set, in accordance with some embodiments.

FIG. 3 illustrates the example light intensity histogram 200 wherein two images are captured with different exposure sensitivity parameters such that a broader portion of the light intensity histogram 200 is captured within a set, in accordance with some embodiments. While FIG. 3 illustrates two images that are captured, any number of images may be captured by the camera 110 with different exposure sensitivity parameters.

The camera 110 can generate an improved image of a plant based on pixel values captured in the multiple images. The images each capture a portion of the field that includes a subject plant. The portions of the field captured by the images may be overlapping portions of the field or the same portion of the field, and may be captured by one camera 110 or by more than one camera 110. The pixels captured by each image may have values within a set pixel range, like the image in FIG. 2. However, the exposure sensitivity parameter for each image is offset such that the portions of the light intensity histogram 200 captured by the set pixel ranges of the images capture a larger total portion 300 of the light intensity histogram 200 than a single image as illustrated in FIG. 2. For example, the first image may be captured with high exposure sensitivity parameters, thereby capturing a portion 300a of the light intensity histogram 200 with lower light intensity values, and the second image may be captured with low exposure sensitivity parameters, thereby capturing a portion 300b of the light intensity histogram 200 with higher light intensity values. The images can be digitally stitched together to generate a single improved image of the plant with pixels that have a broader range of values than the images originally captured by the camera 110.

Example Image-Segment-Based Method for Adjusting Camera Parameters

FIG. 4 is a flowchart for an example method of adjusting camera operation parameters for a camera of a plant treatment system, in accordance with some embodiments. Alternative embodiments may include more, fewer, or different steps from those illustrated in FIG. 4, and the steps may be performed in a different order from that illustrated in FIG. 4. Additionally, each of these steps may be performed automatically by the plant treatment system without human intervention.

The plant treatment system receives 400 an image of one or more plants in a field from the camera. In some embodiments, the plant treatment system receives an image from a secondary camera that is used to capture images for adjusting the camera operation parameters of the camera. The received image may be an image captured directly by the camera or may be processed to increase the range of pixel values that are used by the image. The one or more plants captured in the received image can include a crop plant or a weed plant.

The plant treatment system generates 410 segments of the image that describe portions of the image with similar pixel values. For example, the plant treatment system may generate superpixel segments of the image that contain pixels with similar color values. When generating segments of the image, the plant treatment system may use segmentation parameters to balance (i) larger segments with a broader range of pixel values with (ii) smaller segments with a smaller range of pixel values. In some embodiments, the plant treatment system uses segmentation parameters that favor larger segments so that the generated segments more closely focuses on plant surfaces of plants captured in the image.

In some embodiments, the camera of the plant treatment system automatically color balances images of plants in the field. Images may also be color balanced manually by operators or developers of the plant treatment system. In some embodiments, the plant treatment system color balances 420 on images received from the camera. To color balance the received images, the plant treatment system can cluster the generated segments of the image based on the average color values of the pixels within the segments. In some embodiments, the plant treatment system uses k-clustering to cluster the generated segments. The plant treatment system can then use a modified gray-world balancing process to color balance the received images. The plant treatment system may determine a weighted average of the pixel values in the image, where pixels values are weighted based on the number of pixels in segments in each cluster. For example, the plant treatment system may weight more highly pixels that are associated with clusters with fewer total pixels in the cluster's segments than pixels that are associated with clusters with more total pixels in the cluster's segments. In some embodiments, the weight for a pixel is calculated as $$1 - \frac{S}{C},$$

where S is the number of pixels in the cluster associated with the pixel and C is the total number of pixels in the image. By weighting pixels in smaller clusters above pixels in larger clusters, the plant treatment system can improve the color balance in images with small portions of color and larger portions of nearly uniform color. Thus, the plant treatment system can improve the color balance of images received from the camera, since the captured images may predominantly describe one or more plants in the foreground with a generally uniform colored background of the ground.

The plant treatment system classifies 430 the generated segments as representing or not representing plants within the image. To classify the segments, the plant treatment system may compare histograms of color values within the segments to one or more histograms that model typical color values for segments representing plants within the image. In some embodiments, the plant treatment system determines a likelihood for each of the generated segments that represents the likelihood that the segment represents a portion of a plant. The plant treatment system may then use a threshold for the likelihood to classify the generated segments as representing a plant or not representing a plant. In some embodiments, the plant treatment system uses the determined likelihoods of adjacent segments to determine the likelihood that a generated segment represents a plant. For example, the plant treatment system may generate a Markov random field for the generated segments and may use the Boykov-Kolmogorov algorithm to determine the likelihoods that the segments of the image represent plants.

The plant treatment system further classifies 440 the segments based on exposure types. More specifically, the plant treatment system can determine whether each of the generated segments is over or under exposed. In some embodiments, the plant treatment system uses the lightness of the pixels in the Lab color space to determine whether a segment is over- or under-exposed. For example, the plant treatment system may use thresholds for the average lightness of pixels within a segment to determine whether the segment is over- or under-exposed. The plant treatment system adjusts 450 the camera operation parameters for the camera based on the exposure types of the segments. For example, the plant treatment system may adjust the gain or the shutter speed of the camera to adjust the exposure of images captured by the camera. The plant treatment system may adjust the camera operation parameters to reduce the total number of segments that are classified as over- or under-exposed. The plant treatment system also may prioritize reducing over-exposed segments above reducing under-exposed segments when adjusting the camera operation parameters, or vice versa. Furthermore, the plant treatment system may prioritize the adjustment of some camera operation parameters in certain circumstances. For example, if the plant treatment system reduces the exposure of images captured by the camera, the plant treatment system may prioritize lowering the gain of the camera above lowering the shutter speed of the camera. Similarly, if the plant treatment system raises the exposure of images captured by the camera, the plant treatment system may prioritize raising the shutter speed of the camera above raising the gain of the camera.

Example Pixel-Based Method for Adjusting Camera Parameters

FIG. 5 is a flowchart for an example method of adjusting camera operation parameters for a camera of a plant treatment system, in accordance with some embodiments. Alternative embodiments may include more, fewer, or different steps from those illustrated in FIG. 5, and the steps may be performed in a different order from that illustrated in FIG. 5. Additionally, each of these steps may be performed automatically by the plant treatment system without human intervention.

The plant treatment system receives 500 an image from the camera of one or more plants in a field. In some embodiments, the plant treatment system receives an image from a secondary camera that is used to capture images for adjusting the camera operation parameters of the camera. The received image may be an image captured directly by the camera or may be processed to increase the range of pixel values that are used by the image. The one or more plants captured in the received image can include a crop plant or a weed plant.

The plant treatment system identifies 510 pixels within the image that represent plants. The plant treatment system uses a plant detection model to identify plant pixels within the image. While the plant treatment system may generate the plant detection model locally, in some embodiments, the plant treatment system receives a pre-generated plant detection model from a remote server. The plant detection model is a machine-learned model that detects pixels in an image that represent plants. The plant detection model may include a Gaussian Mixture Model or a Deep Neural Network. The plant detection model may be trained based on images whose pixels have been labeled as representing plants or not as representing plants. In some embodiments, the labeled images are represented in the hue-saturation-value (HSV) space and the pixel values that are labeled as representing plants are plotted in the hue-saturation (HS) space. The plant detection model may then be trained by identifying a plant identification region within the HS space that is used to identify plant pixels in images received from the camera. For example, the plant treatment system may identify pixels in images received from the camera as representing plants if their values in HS space fall within the plant identification region. In some embodiments, the plant identification region is a predetermined shape, such as an ellipse. While the plant detection model is primarily described herein as identifying plant pixel values in HS space, other color spaces (such as YUV or Lab space) may be used.

The size and shape of the plant identification region may be established to balance the sensitivity of the plant detection model. For example, the size of the plant identification region may be increased to identify more pixels as representing plants or may be decreased to identify fewer pixels as representing plants. In some embodiments, the size and shape of the plant identification region is set to maximize the number and size of larger (i.e., above some threshold) continuous sections of the image that represent plant pixels while minimizing the size of the smaller (i.e., below some threshold) continuous sections of the image that represent plant pixels. Furthermore, the plant detection model may include multiple plant identification regions that are used for identifying plant pixels of different types. For example, the plant detection model may have different plant identification regions for crop plants and for weed plants. In some embodiments, the plant identification regions are stored as lookup tables that convert pixel values to Boolean values of whether a pixel represents a plant. The lookup tables may convert HSV pixel values, RGB pixel values, or Lab space pixel values to the Boolean values.

Figure 6:
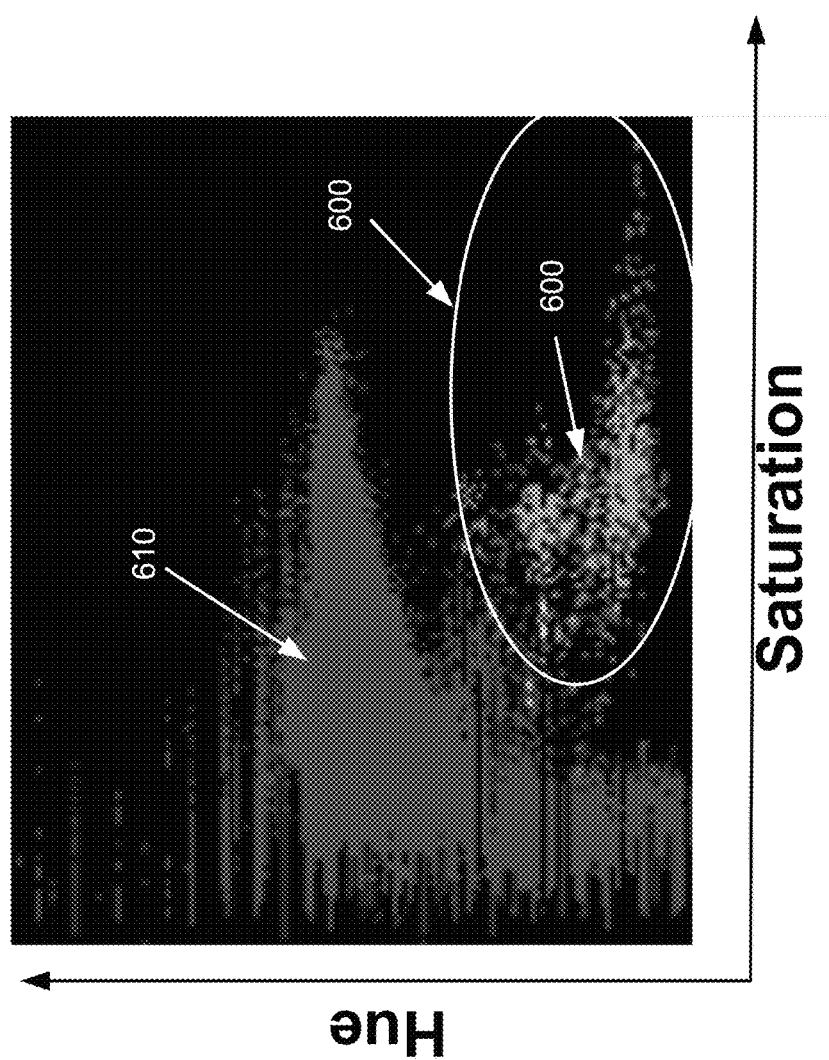
FIG. 6 illustrates an example plant identification region in HS color space, in accordance with some embodiments.

FIG. 6 illustrates an example plant identification region 600 used by the plant treatment system, in accordance with some embodiments. FIG. 6 illustrates an example HS plot of pixel values for plants 600 and for dirt 610. The plant treatment system may identify pixel values within the plant identification region as pixels that represent plants. While the example plant identification region in FIG. 6 is illustrated as a single ellipse, alternative plant identification regions may comprise regions with different shapes and with more than one continuous region in HS color space.

The plant treatment system adjusts 520 the camera operation parameters of the camera based on the pixel values of the pixels in the received image that have been identified as representing plants. The plant treatment system may use brightness values of plant pixels in the HSV space to determine whether plant pixels are over- or under-exposed. For example, the plant treatment system may determine that a plant pixel is over-exposed if the brightness for the plant pixel is above some threshold or may determine that the plant pixel is under-exposed if the brightness for the plant pixel is below some threshold. The plant treatment system may adjust the camera operation parameters to reduce the total number of pixels that are over- or under-exposed. The plant treatment system also may prioritize reducing over-exposed pixels above reducing under-exposed pixels when adjusting the camera operation parameters, or vice versa. Furthermore, the plant treatment system may prioritize the adjustment of some camera operation parameters over others in certain circumstances. For example, if the plant treatment system reduces the exposure of images captured by the camera, the plant treatment system may prioritize lowering the gain of the camera above lowering the shutter speed of the camera. Similarly, if the plant treatment system raises the exposure of images captured by the camera, the plant treatment system may prioritize raising the shutter speed of the camera above raising the gain of the camera.

Additional Configurations

The plant treatment system may use a neural network to identify plants in images captured by the camera. For example, the plant treatment system may use a modified SSD neural network model, as described in U.S. Provisional Patent Application Nos. 62/580,290 and 62/503,770. In some embodiments, the plant treatment system uses feedback from the neural network that detects plants in images to adjust camera operation parameters. The performance of the neural network may be used as a reward function to determine whether the camera operation parameters need to be adjusted. As the plant treatment system adjusts the camera operation parameters, if the performance of the neural network increases, the plant treatment system can determine that the adjustments to the camera operation parameters improve the functionality of the plant treatment system and should be maintained. Similarly, if the performance of the neural network decreases, the plant treatment system can determine that the adjustments to the camera operation parameters hinder the functionality of the plant treatment system and should be reversed.

In some embodiments, the plant treatment system varies the rate at which the camera operation parameters are varied over time. For example, the plant treatment system may adjust the camera operation parameters based on only a subset of images captured by the camera during the operation of the plant treatment system and may increase or decrease the subset of images that are used for adjusting camera operation parameters. The subset of images for adjusting the camera operation parameters may be selected by selecting some proportion of captured images as the images are captured or by selecting a subset of captured images stored by the plant treatment system. The following paragraph provides several examples of this process.

The plant treatment system may vary the degree to which the exposure of a newly captured image can influence the adjustments to the camera operation parameters. For example, the plant treatment system may weigh a captured image less heavily in adjusting the camera operation parameters if the plant treatment system has already adjusted the camera operation parameters recently, or multiple times in a given run, or as the camera collects more images during a run, or under various other circumstances. In one embodiment, the plant treatment system resets the rate at which the camera operation parameters are varied when a reset event occurs. A reset event is an event that occurs that may require the plant treatment system to significantly adjust the camera operation parameters of the camera. For example, a reset event may include a change in the weather, a significant change in the lighting of the field, sunrise or sunset, or when the plant treatment system changes direction such as when the plant treatment system rotates to travel from one row of crops to another. In some embodiments, an operator of the plant treatment system can manually cause the plant treatment system to reset the rate at which it adjusts the camera operation parameters.

In some embodiments, the plant treatment system may use the camera operation parameters to determine whether a failure has occurred. For example, if the camera operation parameters are adjusted above a threshold or if the camera operation parameters are adjusted to a value that is sufficiently different from previous camera operation parameters, the plant treatment system may determine that a failure has occurred. Example failures that the plant treatment system can identify include light leaks in shrouds used to cover plants as the plant treatment system moves through the field (e.g., from a hole in the shroud) or if there is insufficient light for the plant treatment system to identify plants in the field.

In some embodiments, the plant treatment system may adjust external lighting used to light plants in the field based on the camera operation parameters. The plant treatment system may include one or more lighting systems that project light onto plants as the plant treatment system captures images of the plants. If the camera operation parameters are adjusted beyond a threshold amount (e.g., above or below a threshold value), the plant treatment system may adjust the lighting system to normalize the camera operation parameters to more typical values. For example, if the gain of the plant treatment system is adjusted above some threshold value, the plant treatment system may adjust the lighting system to increase the amount of light provided by the lighting system.

The methods and systems for adjusting camera operation parameters of a plant treatment system described herein can improve the plant treatment system's ability to identify and treat plants by ensuring that camera operation parameters of the camera are optimized for capturing images of plants. FIG. 7A illustrates an example light intensity histogram illustrating an example distribution 700 of light intensities received at pixels of an imaging sensor of the camera when capturing an image, in accordance with some embodiments. FIG. 7A additionally includes an example distribution 710 of light intensities for pixels that represent plants in images captured by the camera, in accordance with some embodiments. Conventional camera operation parameters may be optimized to capture a portion 720 of the light intensity distributions that are optimized for the distribution 700 for the image as a whole, but the conventional camera operation parameters may be ineffective at capturing portions of the light intensity distribution 710 for plants pixels. This reduces the range of pixel values that can be used to represent plant pixels, and thereby can reduce the effectiveness of the plant treatment system.

Figure 7B:
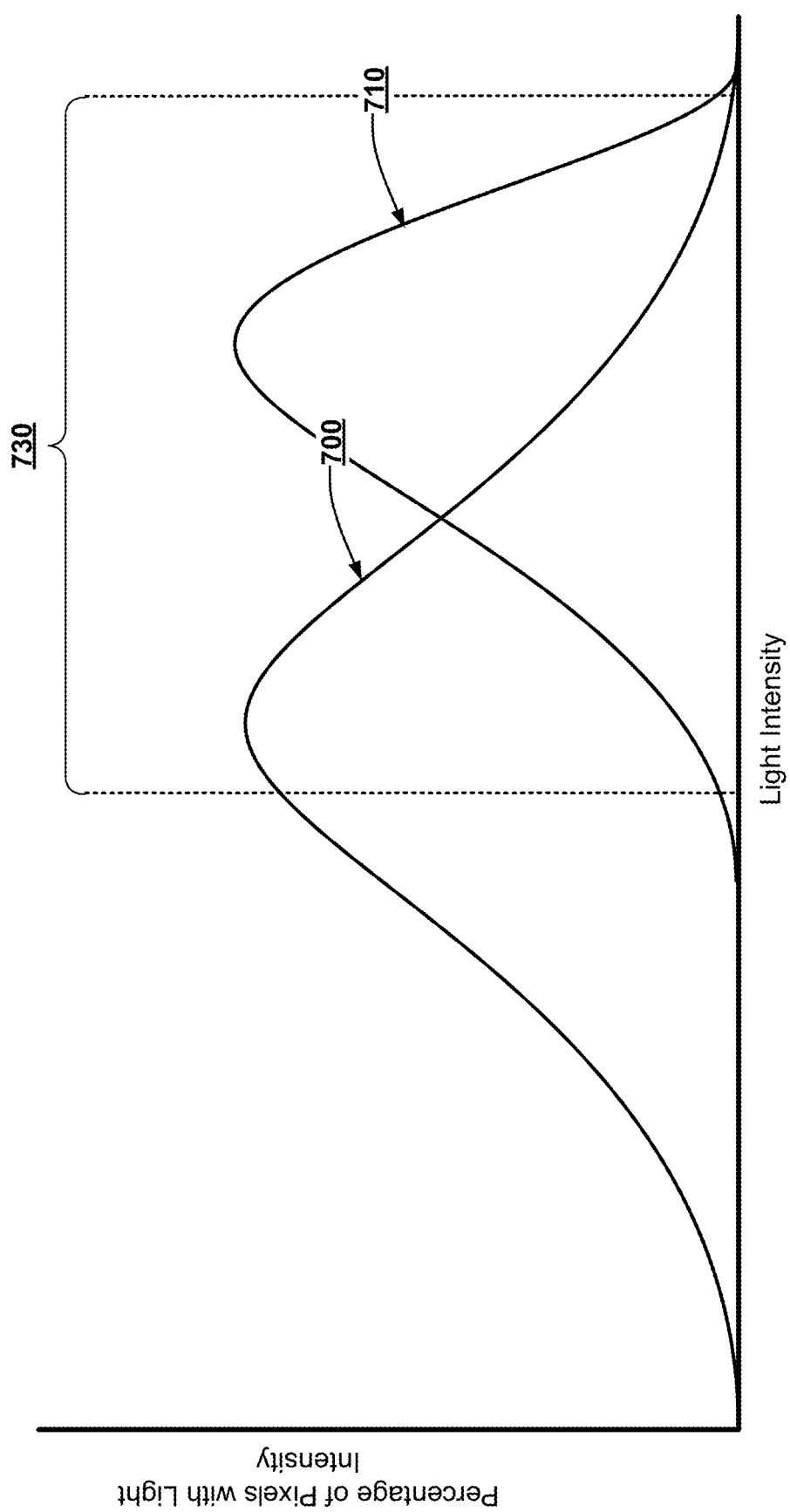
FIG. 7B illustrates a region of an example light intensity histogram captured with adjusted camera operation parameters, in accordance with some embodiments.

FIG. 7B illustrates the example light intensity histogram of FIG. 7A with camera operation parameters that are adjusted in accordance with methods described herein, in accordance with some embodiments. The portion 730 of the example light intensity histogram captured using the adjusted camera operation parameters ensure that a broader range of pixel values can be used to describe plant pixels, which thereby allows the plant treatment system to more effectively identify and treat plants.

Additional Considerations

The foregoing description of the embodiments has been presented for the purpose of illustration; it is not intended to be exhaustive or to limit the patent rights to the precise pages disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments a computer-readable medium comprises one or more computer-readable media that, individually or together, comprise instructions that, when executed by one or more processors, cause the one or more processors to perform, individually or together, the steps of the instructions stored on the one or more computer-readable media.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method for adjusting operating parameters of an imaging sensor mounted on a plant treatment system as the plant treatment system moves through a field, the method comprising:
    capturing, by the imaging sensor mounted to the plant treatment system, an image of a plant in the field comprising a plurality of pixels, wherein each pixel of the plurality of pixels comprises a light intensity measurement in a color space;
    inputting the captured image into a plant detection model trained to identify the plant in the field by:
        for each pixel of the plurality of pixels, determining if the pixel represents the plant in the field by comparing a light intensity measurement of the pixel to a set of light intensity measurements in the color space that represent plants; and
    responsive to determining that pixels of the captured image represent the plant in the field, adjusting one or more operating parameters of the imaging sensor to control an exposure sensitivity parameter of the imaging sensor based on the light intensity measurements corresponding to the pixels representing the plant.

2. The method of claim 1, wherein the light intensity measurement of each pixel represents a brightness value of each pixel of the plurality of pixels in HSV color space.

3. The method of claim 1, wherein the set of light intensity measurements that represents plants correspond to a two-dimensional region of light intensity measurements having a predetermined shape within the color space.

4. The method of claim 1, further comprising:
    capturing, by the imaging sensor, a plurality of images of the plant in the field, wherein each image of the plurality of images is captured with a different exposure sensitivity parameter of a plurality of exposure sensitivity parameters;
    generating an improved image by combining one or more of the plurality of images captured using the plurality of exposure sensitivity parameters; and
    inputting the improved image into the plant detection model to identify the plant in the field.

5. The method of claim 4, wherein the different exposure sensitivity parameters used to capture the plurality of images are selected such that each image of the plurality of images comprises pixels with light intensity measurements in a subset of the set of light intensity measurements representing plants.

6. The method of claim 1, wherein the plant detection model is trained using training image data comprising an array of labelled light intensity measurements in the color space, the array of labelled light intensity measurements comprising a first set of pixels having light intensity measurements representing plants and labeled as representing plants and a second set of pixels having light intensity measurements not representing plants and labeled as not plants.

7. The method of claim 6, further comprising:
training the plant detection model to determine a two-dimensional region in the color space, wherein determining the two-dimensional region in the color space comprises:
determining a shape of the two-dimensional region in the color space that prioritizes a high number of continuous sections of images that represent plants and small sizes of the continuous sections of the images.

8. The method of claim 1, wherein adjusting the one or more operating parameters of the imaging sensor further comprises one of:
adjusting a gain of the imaging sensor;
adjusting a white balance of the imaging sensor; and
adjusting a shutter speed for the imaging sensor.

9. The method of claim 1, wherein adjusting the one or more operation parameters of the imaging sensor further comprises one of:
varying a first rate at which the one or more operating parameters of the imaging sensor are updated over time;
varying a second rate at which the one or more operating parameters of the imaging sensor are updated based on a number of images that the plant treatment system has used to previously adjust the operating parameters of the imaging sensor; and
varying a third rate at which the one or more operating parameters of the imaging sensor are updated based on a number of images in a previous sequence of images captured by the imaging sensor between instances when the operating parameters of the imaging sensor are updated.

10. A method for adjusting operating parameters of an imaging sensor mounted on a plant treatment system as the plant treatment system moves through a field, the method comprising:
capturing, by the imaging sensor mounted to the plant treatment system, an image of a plant in the field comprising a plurality of pixels, wherein each pixel of the plurality of pixels in the captured image comprises a pixel value;
inputting the captured image into a plant detection model trained to identify the plant in the field by:
for each pixel of the plurality of pixels, determining if the pixel represents the plant in the field based on the pixel value of the pixel; and
responsive to determining that pixels of the captured image represent the plant in the field, adjusting one or more operating parameters of the imaging sensor to control an exposure sensitivity parameter of the imaging sensor based on the pixel values of the pixels representing the plant in the field.

11. The method of claim 10, wherein the pixel value of each pixel of the plurality of pixels describes a light intensity measurement representing a brightness value of the pixel in HSV color space.

12. The method of claim 10, further comprising:
capturing, by the imaging sensor, a plurality of images of the plant in the field, wherein each image of the plurality of images is captured with a different exposure sensitivity parameter of a plurality of exposure sensitivity parameters;
generating an improved image by combining one or more of the plurality of images captured using the plurality of exposure sensitivity parameters;
inputting the improved image into the plant detection model to identify the plant in the field.

13. The method of claim 10, wherein determining if the pixel represents the plant in the field based on the pixel value of the pixel further comprises:
converting, using a lookup table, the pixel value of the pixel to a Boolean value indicating whether the pixel represents plants.

14. The method of claim 10, wherein the plant detection model is trained using training image data comprising an array of labelled pixel values, the array of labelled pixel values comprising a first set of pixels having pixel values representing plants and labeled as representing plants and a second set of pixels having pixel values not representing plants and labeled as not plants.

15. The method of claim 10, wherein adjusting the one or more operating parameters of the imaging sensor further comprises one of:
adjusting a gain of the imaging sensor;
adjusting a white balance of the imaging sensor; and
adjusting a shutter speed for the imaging sensor.

16. The method of claim 10, wherein adjusting the one or more operation parameters of the imaging sensor further comprises one of:
varying a first rate at which the one or more operating parameters of the imaging sensor are updated over time;
varying a second rate at which the one or more operating parameters of the imaging sensor are updated based on a number of images that the plant treatment system has used to previously adjust the operating parameters of the imaging sensor; and
varying a third rate at which the one or more operating parameters of the imaging sensor are updated based on a number of images in a previous sequence of images captured by the imaging sensor between instances when the operating parameters of the imaging sensor are updated.

17. A plant treatment system comprising:
an imaging sensor mounted to the plant treatment system, the imaging sensor configured to capture an image of a plant in a field as the plant treatment system moves through the field, the image comprising a plurality of pixels, wherein each pixel of the plurality of pixels comprises a pixel value;
a processor; and
a non-transitory computer readable storage medium comprising instructions that, when executed by the processor, cause the processor to:
input the captured image into a plant detection model trained to identify the plant in the field by:

determining, for each pixel of the plurality of pixels, if the pixel represents the plant in the field based on the pixel value of the pixel; and responsive to determining that pixels of the captured image represent the plant in the field, adjust one or more operating parameters of the imaging sensor to control an exposure sensitivity parameter of the imaging sensor based on the pixel values of the pixels representing the plant in the field.

18. The plant treatment system of claim 17, wherein instructions for determining if the pixel represents the plant in the field based on the pixel value of the pixel further causes the processor to:

convert, using a lookup table, the pixel value of the pixel to a Boolean value indicating whether the pixel represents plants.

19. The plant treatment system of claim 17, wherein the plant detection model is trained using training image data comprising an array of labelled pixel values, the array of labelled pixel values comprising a first set of pixels having pixel values representing plants and labeled as representing plants and a second set of pixels having pixel values not representing plants and labeled as not plants.

20. The plant treatment system of claim 17, wherein instructions for adjusting the one or more operating parameters of the imaging sensor cause the processor to perform one of:

adjusting a gain of the imaging sensor;

adjusting a white balance of the imaging sensor;

adjusting a shutter speed for the imaging sensor;

varying a first rate at which the one or more operating parameters of the imaging sensor are updated over time;

varying a second rate at which the one or more operating parameters of the imaging sensor are updated based on a number of images that the plant treatment system has used to previously adjust the operating parameters of the imaging sensor; and varying a third rate at which the one or more operating parameters of the imaging sensor are updated based on a number of images in a previous sequence of images captured by the imaging sensor between instances when the operating parameters of the imaging sensor are updated.

* * * * *